United States Patent

Fleming

[15] 3,648,621

[45] Mar. 14, 1972

[54] TRANSPORTATION SYSTEM

[72] Inventor: Kenneth C. Fleming, 1913 W. Monte Vista Road, Phoenix, Ariz. 85009

[22] Filed: Aug. 12, 1970

[21] Appl. No.: 63,235

[52] U.S. Cl. ..........................105/157, 105/177, 105/215 R, 104/1, 104/88
[51] Int. Cl. .......................................................B61f 13/00
[58] Field of Search ....................104/88, 262, 273; 105/177, 105/215 R, 157

[56] References Cited

UNITED STATES PATENTS 3,385,320  5/1968  Kershaw.................................105/177
2,989,926  6/1961  Sublett...................................105/177

Primary Examiner—Arthur L. La Point
Assistant Examiner—D. W. Keen
Attorney—A. John Michel

[57] ABSTRACT

A transportation system comprising a plurality of pairs of parallel spaced apart tracks and a vehicle having two sets of track engaging wheels, each set of wheels being movable laterally relative to said tracks and said vehicle, whereby said vehicle may move laterally from one pair of tracks to an adjacent pair of tracks while traveling longitudinally therealong.

16 Claims, 13 Drawing Figures

INVENTOR.
KENNETH C. FLEMING.

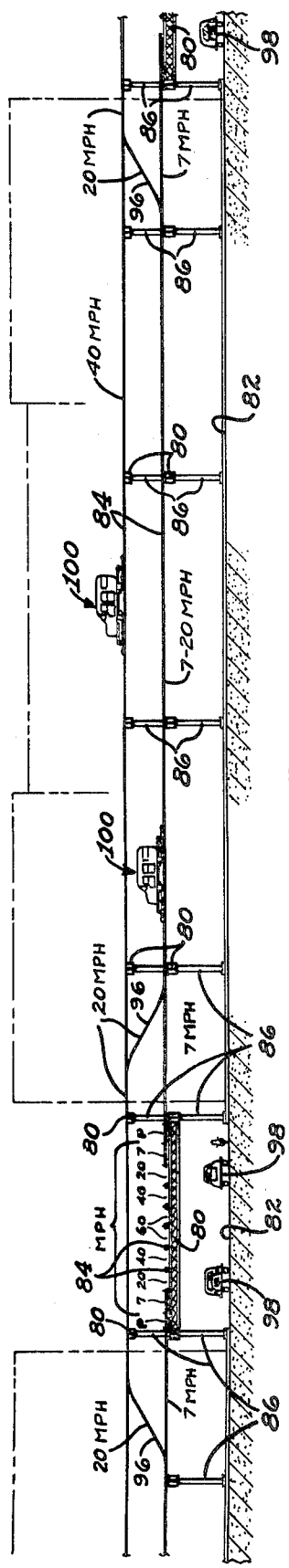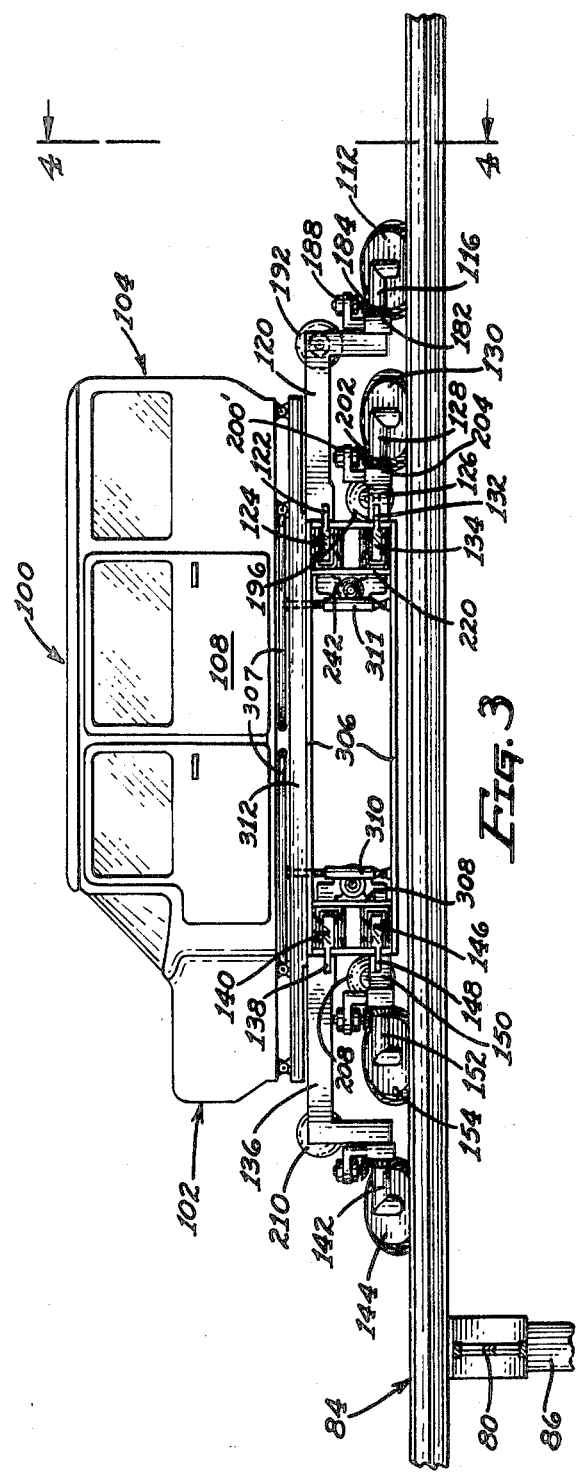

Patented March 14, 1972
3,648,621
5 Sheets-Sheet 3
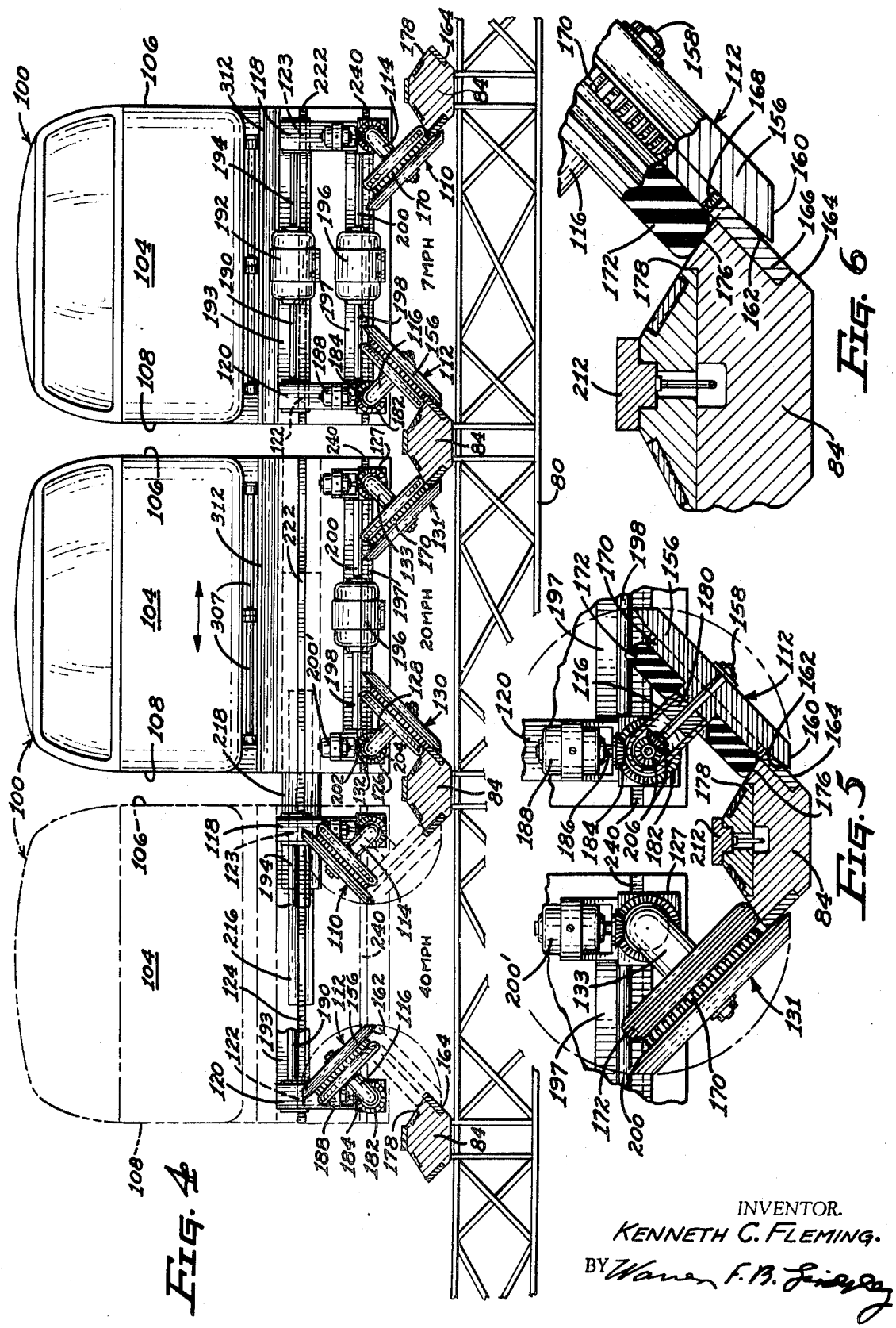
INVENTOR.
KENNETH C. FLEMING.
BY Warren F. B. Lindsay
ATTORNEY.

Patented March 14, 1972
3,648,621
5 Sheets-Sheet 4
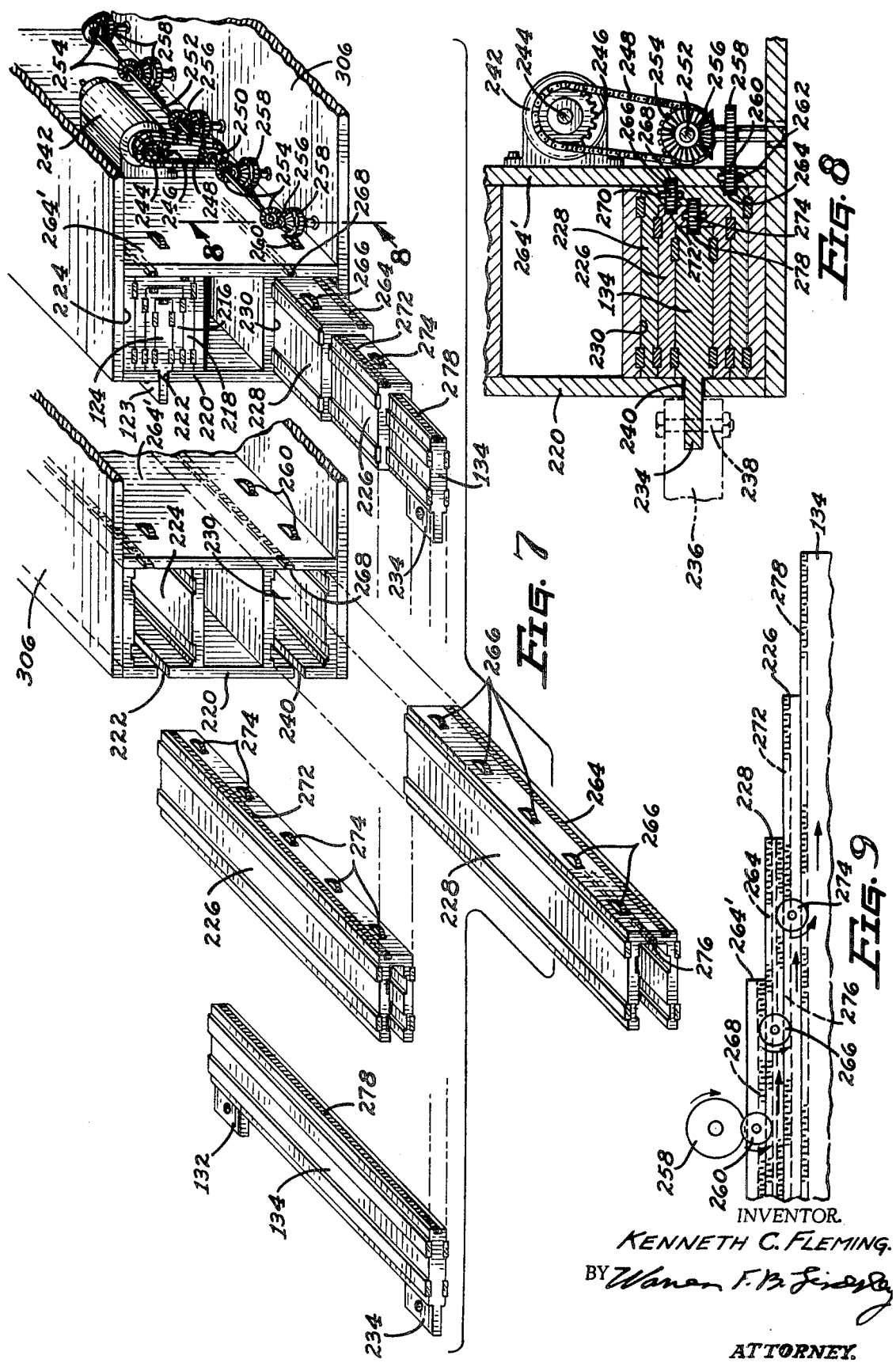
INVENTOR.
KENNETH C. FLEMING.
BY Warren F. B. Lindsley
ATTORNEY.

Patented March 14, 1972
3,648,621
5 Sheets-Sheet 5
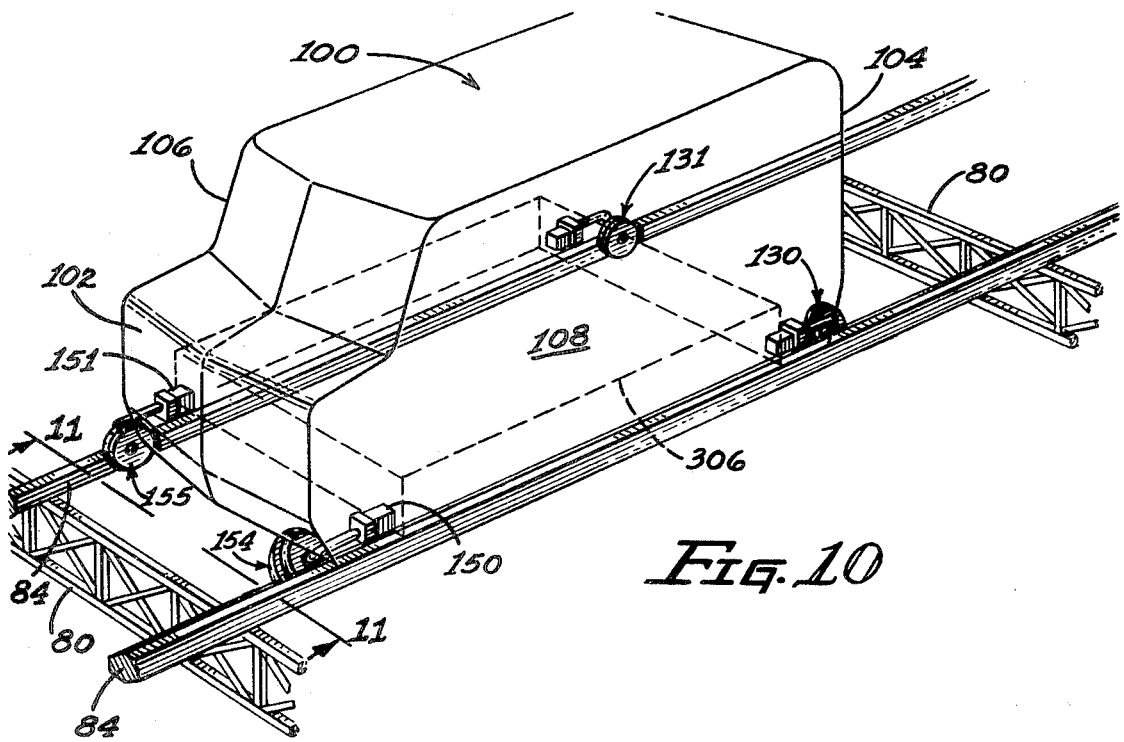
Fig. 10
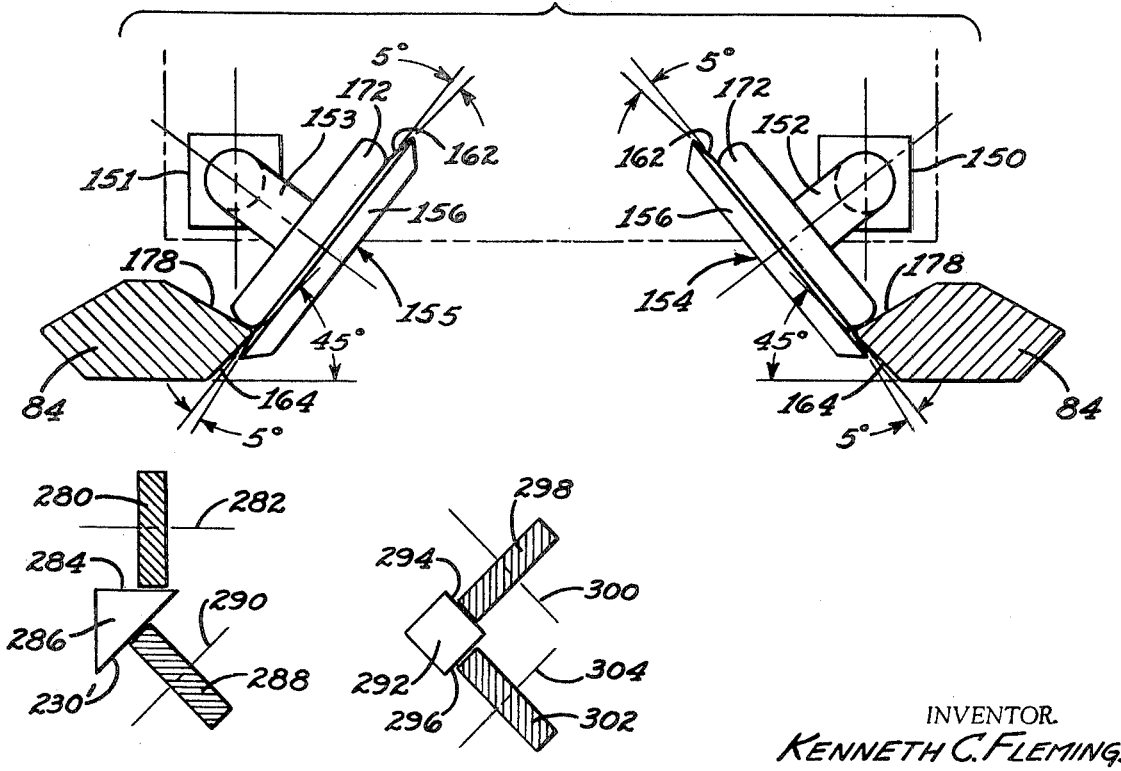
Fig. 11
Fig. 12   Fig. 13
INVENTOR.
KENNETH C. FLEMING.
BY Warren F. B. Lindsley
ATTORNEY.

3,648,621

TRANSPORTATION SYSTEM

BACKGROUND OF THE INVENTION

Present day transportation is primarily accommodated by motor vehicles traveling on conventional roadways or by means of overhead trains and monorail systems. Roadways for motor vehicles, however, are expensive and the space for these roadways is difficult to obtain. Furthermore, the conventional overhead trains and monorail systems are expensive to build and generally operate on a substantially circular pattern devoted to mass transportation of persons traveling to and from work and are not flexible as to time and other facts characteristic of personal transportation.

It has been recognized that present day overhead transportation systems are not satisfactory since they lack the timing and flexible directional factors common to conventional automotive transportation. In addition the use of roads and related automotive transportation has become congested, expensive, and detrimental to ecology since internal combustion engines utilized for automotive transportation pollute the atmosphere.

SUMMARY OF THE INVENTION

In accordance with the present invention a transportation system of very simple construction, relative to its utility, is provided. This system is flexible in timing as well as directional operation and compares favorably with conventional automotive transportation. The invention comprises an overhead system which may be disposed in superimposed relationship with conventional automotive roadways, thereby utilizing existing roadways.

The invention is directed to a novel transportation system employing a plurality of pairs of parallel spaced apart tracks so arranged that various pairs of tracks may be devoted to use by vehicles for traveling at predetermined different speeds.

The invention comprises a novel vehicle having two sets of track engaging wheels whereby each set of wheels is movable laterally relative to the vehicle to enable the vehicle to move laterally from one pair of tracks to an adjacent pair of tracks while traveling longitudinally therealong. Specifically, each set of wheels is coupled to a telescopic means which is extendable and retractable laterally relative to the vehicle and relative to the tracks on which the sets of wheels roll; the telescopic means being so arranged that both sets of wheels may be engaged with two pairs of respective tracks during the time when the body of the vehicle is moved from a position over one pair of tracks to a position over an adjacent pair of tracks. The vehicle and the track structures of the invention afford facilities whereby a private vehicle may proceed onto the track system disclosed and move laterally back and forth from one pair of tracks to adjacent pairs of tracks for maneuvering either to a high speed pair of tracks or to a lower speed pair of tracks. The vehicle of the invention is provided with electrically powered wheel drive means and the tracks of the invention carry conductors adapted to conduct electrical energy for powering the vehicle of the invention.

The tracks of the invention employ novel upper and lower track portions which are angularly disposed to the horizontal so as to provide longitudinal guidance and support for the wheels and holddown features for vehicles moving on the tracks at various speeds. These guidance, support and holddown features are particularly beneficial for vehicles on curves, inclined or declined tracks and in areas where the vehicle may be traveling at high speed.

The wheels are particularly designed so that the wheel flanges are inclined away from the rails at their outer periphery. This will cause the flange to engage the rail on the lower track portion on a limited surface of the flange if at all so that the wheels may move smoothly along the track, around curves, etc. By inclining the wheels on which the flange is mounted as much as approximately 20° to 40°, the flanges will serve as a safety lock or holddown means of the wheel to the track as hereinafter more fully described.

If, as in the prior art, the wheel is vertical to the track, the point of contact of the flange with the rail on any curve will cause a grinding, wearing action of both the flange and the rail.

In other prior art systems that utilize rails the main load-bearing wheels are guided by horizontal wheels that ride along the sides of the rail. On any curve the horizontal wheels drag the main load-bearing wheels around the curve.

The tracks of the invention accommodate resilient vehicle supporting tires engaging the upper track portion of each track, said tracks also include gear rack means in connection therewith which are meshingly engageable by circular gears in connection with the wheels of the vehicle so as to provide positive traction on steep grades or during adverse weather conditions when ice or snow may be on the tracks.

Accordingly, it is an object of this invention to provide a new and improved transportation system having flexibility of timing and direction of travel not found in conventional overhead transportation systems.

Another object of this invention is to provide a novel overhead transportation system superimposed above conventional automotive roadways which employs vehicles having maneuverability comparing favorably with conventional internal combustion engine powered automotive vehicles.

Another object of this invention is to provide a novel transportation system which is favorable to the ecology, since only electrical energy may be required to motivate the vehicles of the system.

Another object of this invention is to provide novel means for moving two sets of vehicle supporting wheels laterally with relation to opposite sides of the vehicle in order to move the vehicle laterally from one pair of tracks to an adjacent pair of tracks while the vehicle is moving therealong.

Another object of this invention is to provide novel means for telescopically extending or retracting a set of vehicle supporting wheels laterally relative to the vehicle and the tracks on which it is operating.

Another object of this invention is to provide a novel combination of tracks and a vehicle wheel elevating mechanism enabling sets of vehicle supporting wheels to be rotated out of interference with supporting tracks and to be engaged with other tracks laterally disposed.

Another object of this invention is to provide a novel vehicle supporting track structure which allows the disclosed vehicle to operate smoothly at high speed, around turns, and up and down relatively steep grades with complete safety.

Further objects and advantages of the invention may be apparent from the following specifications, appended claims, and accompanying drawings.

BRIEF DESCRIPTION OF THE DRAWINGS

FIG. 2 is a side elevational view partly in cross section of the track structures of the invention as shown on FIG. 1 of the drawings taken substantially on line 2—2 of FIG. 1;

FIG. 3 is an enlarged side elevational view of a track structure showing a vehicle of the invention on the structure;

FIG. 4 is an enlarged fragmentary sectional view along line 4—4 of FIG. 3 of the track structures showing vehicles of the invention thereon and illustrating by broken lines lateral movement of one of the vehicles from one pair of tracks to an adjacent pair of tracks;

FIG. 5 is an enlarged fragmentary sectional view showing an individual track structure of the invention and opposed track portions thereof engaged by the wheels of the vehicle and illustrating by broken lines pivotal paths of movement of said wheels for engagement or disengagement relative to the track portions of the track structure;

FIG. 6 is a fragmentary view similar to FIG. 5 but showing the track structure on a substantially enlarged scale relative thereto;

FIG. 7 is a fragmentary perspective view showing telescopic wheel carrying structures of the invention and illustrating parts thereof in exploded relation to each other;

FIG. 8 is an enlarged fragmentary sectional view taken from the line 8—8 of FIG. 7;

FIG. 9 is a diagrammatic view of the power driven gear means used for telescopically extending and retracting the telescopic wheel supporting means of the invention;

FIG. 10 is a perspective view of a vehicle on a pair of track structures showing a modification of the invention;

FIG. 11 is a diagrammatic view illustrating a cross section of a pair of adjacent track structures and a set of wheels of the vehicle in engagement therewith;

FIG. 12 is a cross sectional diagrammatic view of a modified track and wheel structure of the invention; and FIG. 13 is a further view similar to FIG. 12 and showing an additional modification of the wheel and track structure of the invention.

DESCRIPTION OF THE PREFERRED EMBODIMENT

Figure 1:
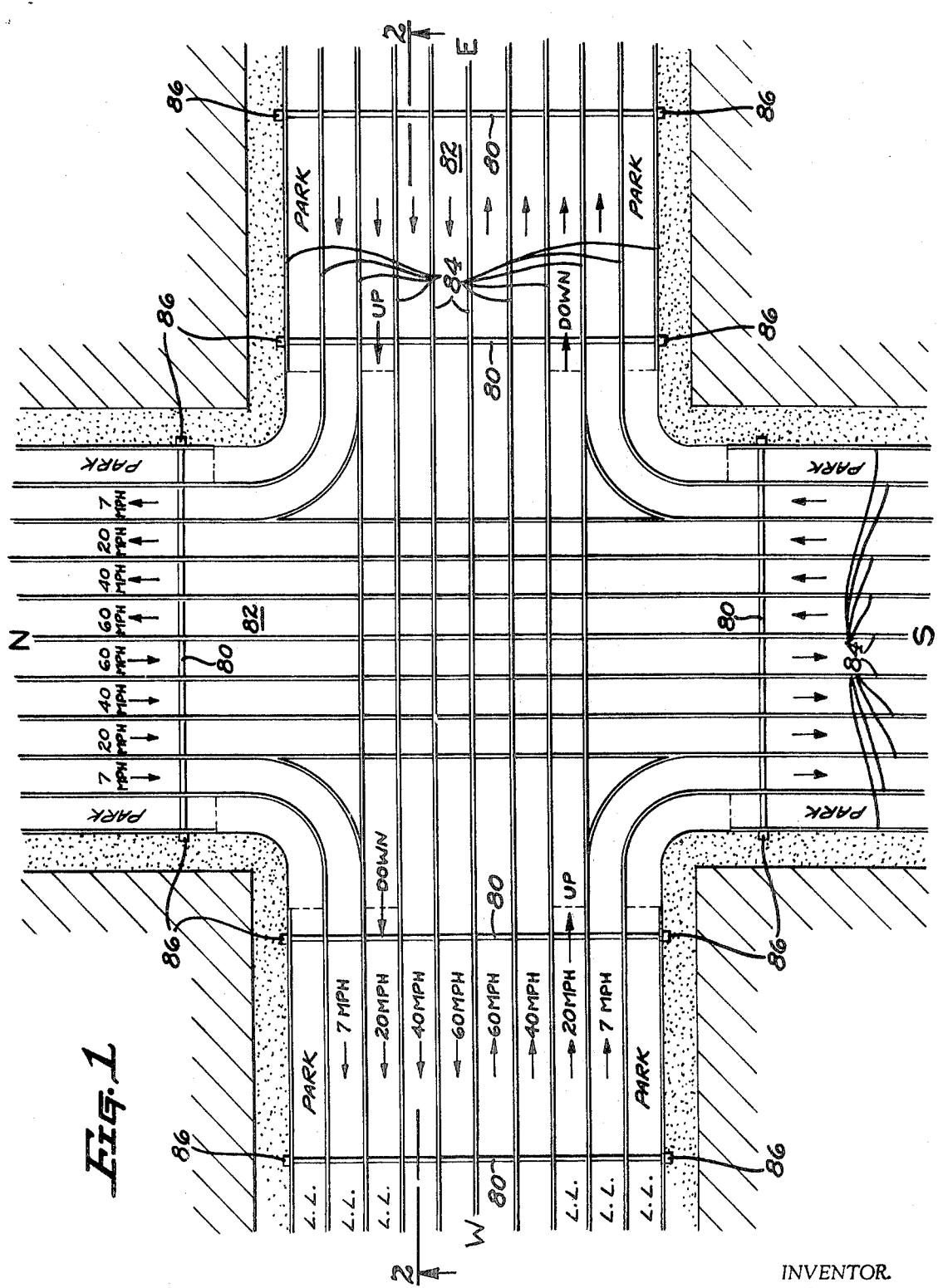
FIG. 1 is a plan view of a plurality of pairs of parallel spaced apart tracks at an intersection and identifying various pairs of tracks for vehicles' use at given speeds and embodying the invention.

As shown in FIGS. 1, 2 and 4 of the drawings the track structures 84 of the invention are supported on suitable beams 80 immediately above and in superimposed transverse relationship to conventional automotive roadways 82.

The beams 80 are supported on columns 86 of suitable height, located in alignment at opposite sides of the roadways 82. In FIGS. 1 and 2 lower level track structures 84 are disposed in a north and south direction and upper level track structures 84 are disposed in an east and west direction to provide the necessary clearance for vehicles traveling in different directions at intersections.

Designations relating to speed appear between the track structures 84 of FIG. 1. These designations are numerical and are followed by letters (m.p.h.) designating miles per hour ranging from 7 to 60 m.p.h. It will be apparent to those skilled in the art that vehicles traveling on the track structures 84 may attain higher or lower speeds than these designations since they are only examples of various speeds which may be attainable in relation to certain pairs of the tracks. The 20, 40 and 60 m.p.h. tracks are used for through travel across the intersection and the 20 m.p.h. tracks are used for traveling from an upper level of the tracks to a lower level of the tracks going in an east to west direction. They are also disposed adjacent inclined track structures 96 in FIG. 2 which are used for moving from the lower level tracks to the upper level tracks, or vice versa. Thus, the traffic moving in either direction at high speed may move laterally on the track structures 84, as will be hereinafter described, from the relatively high speed 40 and 60 m.p.h. tracks to the lower speed 20 m.p.h. tracks prior to changing levels whereupon vehicles may then move onto 7 m.p.h. tracks for proceeding in a right-hand turn around a corner. The 7 m.p.h. tracks may be used to move onto the 20 m.p.h. tracks to proceed from the lower level tracks to the upper level tracks, all as indicated by legends and arrows in FIGS. 1 and 2 of the drawings. The lower level tracks, going north and south, are provided with pairs of track structures on which the vehicles of the invention may travel at relatively high speeds of 40 m.p.h. to 60 m.p.h., for example, for attaining a smooth flow of uninterrupted high speed traffic through the intersection, as shown on FIG. 1, in a north to south or south to north direction.

The legends LL indicate a lower level of the tracks 84 supported on the beams 80 and the tracks designated 20 m.p.h. and also designated LL are those which permit relative movement of vehicles of the invention from an upper level to a lower level, or vice versa, as shown best in FIGS. 1 and 2 of the drawings.

The track structures, as shown on FIGS. 1 and 2 of the drawings, are preferably superimposed above conventional roadways 82 on which automotive vehicles 98 travel. Using the space above conventional automotive roadways alleviates the necessity of clearing right-of-ways for installation of the transportation system of the present invention, and also provides for communication throughout established routes.

The outermost track structures 84, shown in FIG. 1 of the drawings, are utilized for parking vehicles of the invention hereinafter described, which may be moved laterally from the 7 m.p.h. track structures to the track structures designated PARK. These track structures designated PARK may be directed to any suitable lateral track structure similar to those shown in FIGS. 1 and 2 of the drawings utilized for the purpose of providing not only parking of the vehicles but for disposing individually owned vehicles near business or domestic areas or homes or places of business normally visited by users of such vehicles.

As shown in FIGS. 2, 3 and 4 of the drawings, vehicles 100 in accordance with the present invention are provided with forward and rearward ends 102 and 104, respectively (shown in FIG. 3) and right and left sides 106 and 108, respectively (shown in FIG. 4).

The rearward end 104 of each vehicle 100 is supported on the track structures 84 by means of a pair of wheels 110 and 112 which are near respective right and left sides 106 and 108 of the respective vehicles 100. The wheels 110 and 112 are supported by respective struts 114 and 116. These struts are generally L-shaped and are pivotally mounted about a substantially horizontal axis generally parallel to the track structures 84 so that these wheels may be pivoted upward and downward to disengage and reengage them with the track portions of the track structures 84 as will be hereinafter described in detail.

As shown in FIG. 4, the struts 114 and 116 are rotatably mounted on substantially L-shaped brackets 118 and 120 which are substantially identical in construction but which are opposite hand relative to each other in order to function cooperatively at respective right and left sides 106 and 108 of the respective vehicles 100.

The bracket 120 is fixed at its forward end to a projecting tab 122 of a telescopic member 124 and the bracket 118 is secured to another tab 123 similar to tab 122 carried by the telescopic member 124.

The structure and function of the telescopic members such as the member 124 will be hereinafter described in detail.

Disposed below brackets 118 and 120 are brackets 126 and 127, one of which is shown in FIG. 3 of the drawings.

A strut 128 similar to strut 116 is rotatably mounted on a horizontal axis relative to bracket 126 and rotatably supports a wheel 130 similar to wheel 112. Another wheel similar to wheel 130 and disposed forwardly of wheel 110 is rotatably mounted on a strut similar to strut 128 but opposite hand thereto.

Bracket 126 is connected to a tab 132 of the telescopic member 134 similar to the telescopic member 124 hereinbefore described. It will be seen that the telescopic member 134 is disposed below the telescopic member 124 as shown in FIG. 3 of the drawings.

The telescopic member 134 is provided with another tab 234 similar to the tab 132 for supporting another bracket similar to the bracket 126.

Accordingly it will be understood that a pair of track engaging wheels such as wheels 130 and 131 are supported in connection with the telescopic member 134 and these wheels are generally aligned with wheels 110 and 112 supported in connection with the telescopic member 124 hereinbefore described.

Disposed at the forward end of vehicle 100 are bracket structures designated 136 and these bracket structures 136 are similar to the bracket structures 118 and 120. These bracket structures 136 are coupled to a pair of forwardly projecting tabs 138 of the telescopic member 140 and struts 142 are coupled to the brackets 136 to pivot thereon about substantially horizontal axes in a similar manner to the pivotal mounting of the wheels 110 and 112. Thus the brackets 118 and 120 in connection with the telescopic member 124 carry wheels 110 and 112 while a similar pair of brackets 136 carry a similar pair of wheels 144 near the forward end 102 of the vehicle 100.

A telescopic member 146 disposed below the telescopic member 140 is provided with forwardly projecting tabs 148 supporting brackets 150 similar to the brackets 126.

Rotatably mounted on horizontal axes, in connection with the brackets 150 and 151 shown in FIGS. 10 and 11, are struts 152 and 153 carrying wheels 154 and 155 which are similar to the wheels 110 and 112. In accordance with the foregoing it will be appreciated that a pair of wheels is carried by each of the telescopic members 124, 134, 140 and 146 such that the vehicle 100 is supported by eight wheels constituting two sets of four wheels. Either set of four wheels may be moved laterally either to the right or the left side of the vehicle 100, a distance equaling the spacing between the track structures 84 so as to allow the vehicle 100 to move laterally from one pair of parallel track portions to an adjacent pair of parallel track portions of the track structures 84.

All of the wheel structures and their related struts and supporting brackets in connection with the telescopic members are similar and therefore such mechanism in general will be described in connection with FIGS. 4, 5 and 6 of the drawings.

By way of example, the wheels 112 as shown in FIG. 5 of the drawings will be described and will be considered representative of the structures of the remaining seven wheels of vehicle 100.

With reference to FIG. 5 it will be seen that wheel 112 is provided with an annular structure such as a flange or disc 156 which is driven by an axle shaft 158. This wheel disc 156 is provided with a peripheral portion 160 and a track engaging side 162 near said peripheral portion 160. This side 162 is at substantially right angles to the axis of the axle shaft 158 and engages a track portion 164 of a respective track structure 84. The track portion 164 is a lower track portion disposed on an inclined plane so as to prevent upward movement of the disc 156 as the wheel 112 rotates relative to the track structure 84 and moves therealong.

The track structure 84 is provided with a plate 166 having a lower surface forming said track portion 164 and integral with this plate are gear or cog teeth 168 with which a spur or cog gear portion 170 of the wheel 112 meshes. This spur gear portion 170 is mounted on axle shaft 158 adjacent to disc 156. A resilient tire structure 172 is also mounted on the axle shaft 158 by means of a hub portion 174 of the spur gear 170. The resilient tire 172 is provided with a peripheral portion 176 which engages an upper track portion 178 of the track structure 84. The track portion 178 is an upper track portion disposed above the track portion 164 and is inclined relative to the horizontal so as to provide a surface upon which the resilient tire 172 may bear to carry part of the load of the vehicle 100.

It will be seen that the inclined lower and upper track portions 164 and 178 are so disposed that they prevent substantial upward or downward movement of the wheel 112 relative to the track structure 84 when the wheel 112 is rolling thereon. As shown in FIG. 4 of the drawings the wheel 110 engages another track portion 84 in the opposite direction so that the side-to-side stability of the vehicle 100 as shown in FIG. 4 of the drawings is assured during high speed operation, around curves, or over various areas where the tracks of the invention may be disposed.

Wheel 112 is particularly designed so that its flange is inclined away from the rail at its outer periphery. This will cause the flange to engage the rail on the lower track portion on a limited surface of the flange only on an interlocking action but not during normal wheel travel on the rail so that the wheel may move smoothly along the track, around curves, etc. without substantial flange contact. By inclining the wheel on which the flange is mounted as much as approximately 20° to 40°, the flange will serve as a safety lock or holddown means of the wheel to the track. As shown in FIG. 5 the outer periphery of the flange is formed at about 5° away from the lower track portion to limit any possible rubbing surfaces to a minimum.

If, as in the prior art, the wheel is vertical to the track, the point of contact of the flange with the rail on any curve will cause a grinding wearing action of both the flange and the rail.

The shaft 158 is rotatably mounted in a bearing 180 carried in the housing of the strut 116 and this housing is coupled to a circular miter gear 182 which is driven by a meshing miter gear 184 carried by a shaft 186 of a motor 188. Thus the strut 116 together with the wheel 112 may be pivoted upward into an elevated position as shown in FIG. 4 so as to be disengaged from the track portions 164 and 178 and to allow the wheel 112 in connection with the telescopic member 124 to be moved laterally relative to the vehicle 100 as will be hereinafter described in detail.

Shaft 158 is rotatably driven in the hollow strut 116 by means of miter gears in connection with a shaft 190 of a motor 192 and motor 192 is provided with another shaft 194 adapted to drive miter gears for similarly providing tractive power through the strut 114 to the wheel 110, as shown best in FIG. 4 of the drawings. Another motor 196 is provided with shafts 198 and 200 which are disposed to power the wheels 130 and 131, respectively, through the respective struts 128 and 133. The strut 128, for example, is rotatably driven by a shaft 200 having a miter gear 202 coupled to the shaft thereof and meshing with another miter gear 204 similar to the miter gear 182 hereinbefore described.

All of the wheel supporting struts of the invention are provided with internal miter gears 206 meshing with complemental miter gears 208 on respective axle shafts, such as the axle shaft 158 of the wheel 112. Miter gear drives are used in connection with the shafts of the motors 192 and 196 at the rear 104 of the vehicle 100 and similar motors 208 and 210 and miter gear drives are used at the front of the vehicle 100 to rotate the axle shafts in connection with the front wheels 144 and 154.

The motors 192 and 196, as well as similar motors 208 and 210, as shown in FIG. 3 of the drawings, are preferably electric motors adapted to be energized by energy transmitted by conductor means 212 in connection with each of the track structures 84, as shown in FIG. 5 of the drawings.

The telescopic members 124, 134, 140 and 146, as shown in FIG. 3 of the drawings, are all similar in construction and shown in detail in FIGS. 7, 8 and 9 of the drawings.

For purposes of description, the telescopic members 124 and 134 will be described to represent the construction and general operation of all of the telescopic members 124, 134, 140 and 146.

The telescopic member 124 as shown in FIG. 3 of the drawings is provided with a rearwardly projecting tab 122 to which the bracket 120 is secured and is further provided with a tab 123 at its opposite end from the tab 122. Tab 123 supports bracket 118 as described.

The telescopic member 124 as shown in FIG. 7 is telescopically mounted in a substantially U-shaped cross sectional telescopic member 216, which in turn is telescopically supported in another U-shaped cross sectional telescopic member 218, and the telescopic member 218 is telescopically supported in a housing structure 220 which is provided with a slot 222 through which the tabs 122 and 123 project for supporting the brackets 120 and 118, respectively. The housing 220 is provided with a rectangular cross sectional opening 224 in which the outermost telescopic member 218 is slidably fitted and adapted to be moved in cantilever relationship thereto.

The construction of the telescopic member 134 is similar to the telescopic member 124, and is shown in FIG. 7 in a projected position relative to a telescopic member 226 in which the telescopic member 134 is slidably mounted. The telescopic member 226 is slidably mounted in a U-shaped cross sectional telescopic member 228 which is slidably mounted in an opening 230 similar to the opening 224 hereinbefore described.

As shown in FIG. 8 of the drawings, a tab 234 is carried by the telescopic member 134 and this tab is similar to the tab 123 hereinbefore described.

The tab 234 carries one of the wheel supporting brackets 236 shown by broken lines in FIG. 8 of the drawings, and a bolt 238 passes through the respective bracket and the tab 234 for holding said wheel supporting bracket securely in connection with the tab 234. This construction is typical with relation to a connection of all of the wheel supporting brackets such as the brackets 118 and 120 with the respective projecting tabs of the telescopic members 124, 134, 140 and 146.

As shown in FIG. 8 of the drawings, the tab 234 and another similar tab 132 at the opposite end of the telescopic member 134 project through a slot 240 in the sidewall of the housing structure 220.

Mounted on the housing structure 220 is a drive motor 242. This drive motor 242 is provided with an output shaft 244 carrying a sprocket 246 engaging a chain 248 which drives another sprocket 250 coupled to a shaft 252 which is also shown in detail in FIG. 7 of the drawings. This shaft 252 carries a plurality of miter gears 254 which mesh with respective miter gears 256 coupled to spur gears 258 which mesh with spur gears 260 carried on shafts 262 rotatably mounted in a sidewall 264 of the housing 220. The peripheral teeth of the spur gears 260 mesh with a gear rack 264 in connection with the telescopic member 228. This telescopic member 228 is substantially U-shaped in cross section, as shown in FIG. 8, and the gear rack portion 264 is on the substantially closed side of the U-shaped in cross sectional structure of the telescopic member 228.

Carried by the closed side of the telescopic member 228 is a plurality of spur gears 266 which mesh with an internal gear rack 268 coupled to the inside of the housing 220. These spur gears 266 are pivotally mounted on shaft structures 270 carried by the closed sidewall of the telescopic member 228 and peripheral portions of the spur gears 266 also mesh with a gear rack portion 272 carried by the closed sidewall portion of the telescopic member 226. Spur gears 274 are rotatably mounted in the closed sidewall of the telescopic member 226 and peripheral portions of these spur gears 274 mesh with a gear rack 276 carried by the telescopic member 228. These spur gears 274 also mesh with a gear rack 278 carried by the telescopic member 134.

It will be seen that the motor 242 thus drives the shaft 252 and the gears 258, 260, 266 and 274 for tractively extending and retracting all of the telescopic members 134, 226 and 228 relative to the guide opening 230 in the housing 220. It will be obvious that forward or reverse operation of the motor 242 may extend the telescopic members 134, 226 and 228 in either direction laterally relative to opposite sides 106 or 108 of the vehicle 100.

Structure and operation of the remaining telescopic members 124, 140 and 146 is similar so that the wheels and related struts of the invention may be moved laterally relative to opposite sides of the vehicle 100 in either direction as will be hereinafter described with relation to operation in connection with the track structures 84 of the invention.

As shown in FIG. 7, the details of the telescopic members 134, 226 and 228 are shown in exploded relationship to each other together with the actuating spur gears 260, 266 and 274 and the gear racks 264, 268, 272, 276 and 278.

In the exploded view of FIG. 7 the telescopic member 134 is shown in such a manner to expose both the strut supporting tabs 234 and 132 thereof. Accordingly it will be seen that the telescopic member 134 is provided with a pair of spaced apart tabs adapted to carry both the wheel struts 128 and 133 of the wheels 130 and 131 shown in FIG. 4 of the drawings.

FIG. 10 is a diagrammatic illustration of a vehicle of the invention on a pair of the track structures 84 and employing only one set of wheels. FIG. 11 is a view of the structure shown in FIG. 10 merely to illustrate the angular disposition of the wheel geometry of the invention relative to cooperating geometry of the track structures 84.

The lower and upper track portions 164 and 178 of each track structure 84, as hereinbefore described, cooperate with the side 162 of a disc 156 of each wheel such as the wheel 154 to prevent upward movement of the vehicle of the invention during high speed operation, around turns, or other maneuvers and the resilient tire structures 172 generally provide load bearing on the upper track portions 178. These track portions 164 and 178 are preferably inclined approximately 25° to 45° relative to the horizontal so as to be relatively accessible to engagement and disengagement of the wheels with the track portions when the struts supporting such wheels are rotated as indicated by broken lines in FIG. 4 of the drawings, to engage and disengage the wheels with the track portions. The respective wheel flanges or discs are preferably inclined approximately 20° to 40° to provide slight angular clearance relative to said track portions. Additionally, the inclined upper and lower track portions 178 and 164 maintain gravitational relief for material which may tend to collect on the tracks, and during winter weather readily shed or crack snow and ice from the track portions when the wheels of the vehicle traverse the track structures 84. For greatest mechanical efficiency the wheels should be tilted or inclined inwardly from the vertical mounting of the wheel to the vehicle so that the wheels are adaptable to negotiate curves without undue rubbing of the edges of the wheels on the rails.

It will be noted that the annular surface 162 may be disposed at a slight or acute angle to the plane of rotation of the respective wheel as heretofore described.

In FIG. 12 a modification of the wheel structures of the invention is disclosed wherein a load bearing wheel 280 is mounted on the horizontal axis 282 and bears on a horizontal surface 284 of a track structure 286. The wheel 280 serves as a load bearing wheel while another wheel 288 is mounted on an inclined axis 290 and this wheel 288 engages a lower inclined surface 230 of the track structure 286 so as to hold the vehicle of the invention down relative to the horizontal surface 284 when the vehicle is maneuvered around turns or making changes in its disposition from one set of tracks to another.

As shown in FIG. 13, a further modification of the invention comprises a track structure 292 having an upper track portion 294 and a lower track portion 296. These track portions are both inclined to the horizontal and the upper track portion is engaged by a wheel 298 about an axis 300 which is substantially parallel to the plane of the track portion 294. A wheel 302 rotates on the lower track portion 296 and is provided with a rotating axis 304 which is substantially parallel to the plane of the lower track portion 296. It will be seen that these track portions 294 and 296 as shown in FIG. 13 are both inclined to the horizontal and are disposed similarly to the hereinbefore described upper and lower track portions 178 and 164, respectively. The disposition of such track portions allows the wheels of the invention to pivot into and out of engagement with the track portions of the track structures 84 as indicated by broken lines in FIG. 4 of the drawings.

Operation of the vehicle of the invention as it moves laterally from one pair of track portions to an adjacent pair of track portions is illustrated in FIG. 4 of the drawings.

The wheel strut support brackets 120 and 118 are coupled to the projecting tabs of the telescopic member 124 and this telescopic member 124 may be projected laterally relative to the sides of the vehicle 100 as hereinbefore described. The wheel struts 114 and 116 may rotate the wheels 110 and 112, from the broken line position, into the solid line position shown in FIG. 4 so that these wheels may be extended laterally to a pair of track portions on a track structure 84 which is disposed laterally relative to vehicle 100. Wheels 110 and 112 at the rear of the vehicle are projected laterally concurrently with the projection of a pair of wheels at the forward end of the vehicle so that four wheels are projected laterally by the telescopic members at one time. These four wheels are then rotated in connection with their struts into the position indicated by broken lines in FIG. 4 so that both sets of wheels are engaged with the adjacent track portions whereupon the telescopic members may be extended and retracted concurrently to move the body of the vehicle laterally while all four wheels of each set are engaged with track portions of adjacent track structures 84. When the vehicle has been moved laterally from its position over the pair of said track structures to a position laterally thereof, the one set of wheels may then be retracted to a position between opposite sides of the vehicle 100. It will be seen that all of the wheels and their supporting struts are rotatably mounted to allow pivotal clearance of the wheels relative to the track structures 84 so that the wheels may be moved laterally thereover and then pivotally swung into position and into engagement with the upper and lower track portions of the track structures 84 as hereinbefore described.

Accordingly, the vehicle 100 of the invention may move from various pairs of track portions of the track structures as shown in FIG. 1 of the drawings, in order to travel at various speeds or in order to move into the lower speed 7 m.p.h. lane to make turns or to maneuver into the track areas designated PARK as described.

As shown in FIG. 3 of the drawings, a frame structure 306 interconnects the housing 220 at the rear and a similar housing 308 at the forward portion of the vehicle.

Coupled to the frame 306 are screw jacks 310 and 311 which are electrically powered and these screw jacks are coupled to the frame 306 and lifting member 307 mounted on chassis platform 312 so as to provide for raising or lowering forward or rearward ends of the vehicle body relative to the frame 306 during the ascent or descent of the vehicle of the invention in relation to the track structures 84 which may be inclined or declined respectively. Thus, during operation of the invention and during the traversing of the track portions of the track structures 84 by the vehicle 100, leveling of the body of the vehicle may contribute to the comfort of the passengers carried therein.

Although duplicate parts have been shown, it is within the scope of this invention to use one set of parts for dual functions. For example, one set of drive motors 192 and 196 may provide the drive function for motors 208 and 210.

What is claimed is:

1. In a transportation system, the combination of a vehicle having a body provided with right and left sides; a plurality of elongated substantially parallel spaced apart track structures; said vehicle having first and second sets of wheels, each set of wheels being disposed to engage and roll on a pair of said track structures for supporting and moving said vehicle therealong; first and second extendable and retractable means carried by said vehicle; said first means carrying said first set of wheels and being extendable and retractable laterally relative to either side of said vehicle body a distance substantially equal to the distance between an adjacent pair of said track structures, said second means carrying said second set of wheels and being extendable and retractable laterally relative to either side of said vehicle body a distance substantially equal to the distance between an adjacent pair of said track structures; and third means for raising and lowering each set of said wheels relative to said first and second means, whereby one set of said wheels may be raised and moved laterally relative to said vehicle body by either of said first or second means and the lowered into engagement with a pair of said track structures disposed laterally in spaced relationship to said vehicle body while the remaining set of said wheels is still in supporting position on a pair of said track structures below said vehicle body, whereby said body may then be moved laterally away from a position over said remaining set of wheels to a position over said one set of wheels whereupon said remaining set of wheels may the be raised by said third means to permit the respective first or second means to retract said remaining set of wheels to a stowed position substantially between said right and left sides of said body.

2. The invention as defined in claim 1, wherein said third means comprises a strut for each of said wheels, each strut being pivotally mounted on a generally horizontal axis relative to said vehicle body, said axis being generally parallel to the longitudinal disposition of said track structures.

3. The invention as defined in claim 1, wherein each track structure is provided with upper and lower wheel engaging portions which are inclined relative to a horizontal plane; each of said wheels having first and second structures, said first structure being disposed to operate in rolling engagement with said upper wheel engaging portions, and said second structure being disposed for preventing said wheels from lifting off of said track portions.

4. The invention as defined in claim 3, wherein each of said opposed track portions is provided with teeth; said wheels being provided with an annular row of gear teeth adapted to mesh and cooperate with said teeth of said respective track portions.

5. The invention as defined in claim 4, wherein said wheels each comprise a resilient tire for engaging one of said upper wheel engaging portion.

6. The invention as defined in claim 1, wherein said first and second means each comprises a plurality of relatively telescopic members; and housing means of said vehicle telescopically supporting said telescopic members in cantilever relation with respect to said right and left sides of said vehicle when said respective first and second means are extended laterally relative thereto.

7. The invention as defined in claim 6, wherein each of said telescopic members is generally U-shaped in cross section and is provided with a substantially closed side and a relatively open side, said telescopic members disposed one within the other with said closed sides adjacent to each other, the outermost one of said telescopic members being telescopically mounted in said housing means; power driven spur gears having peripheral portions projecting to the inside of said housing; said outer telescopic member having a first spur gear rack at said closed side thereof, said power driven spur gears meshing with said first spur gear rack; second spur gears carried by said outer most telescopic member; a second spur gear rack fixed to the interior of said housing; a second telescopic member inside said outermost telescopic member; a third gear rack carried by said second telescopic member, said second spur gears meshing with both said second the third gear racks; and means extending laterally from said telescopic members; said housing provided with slots through which said last mentioned means extends; struts coupled to said last mentioned means and supporting said wheels on a substantially horizontal axis, said last mentioned axis being substantially parallel with the longitudinal disposition of said track structures.

8. The invention as defined in claim 6, wherein power operated means is provided for operating some of said wheels, said first and second means and said third means.

9. The invention as defined in claim 8, wherein said track structures support conductors or electrical energy for energizing said power operated means.

10. The invention as defined in claim 1, wherein said track structures are supported on horizontal beams spanning a conventional automotive roadway, said beams being supported in superimposed relationship above said roadway.

11. The invention as defined in claim 10, wherein second beam structures are disposed in superimposed spaced relation to said first mentioned beam structures for supporting some of said track structures at angular intersections of said roadway in order to provide for high speed through traffic without interference of vehicles on a common plane.

12. The invention as defined in claim 11, wherein some of said track structures are disposed in inclined and declined relation from the uppermost superimposed track structures to a level of the track structure supported on said first mentioned beam structure.

13. A transportation system as claimed in claim 1 comprising: a vehicle; two sets of wheels for supporting said vehicle, each of said wheels being provided with a flange juxtapositioned to each wheel; and a pair of rails for supporting said wheels, each of said rails being provided with an upper and lower portion which are inclined to each other and a horizontal plane; said upper portion of said rails being engaged by said wheels and said lower portions of said rails locking said flanges to said rails.

14. The transportation system set forth in claim 13 wherein the outer periphery of said flanges of each of said wheels is formed at an acute angle with said lower portion of said rails to reduce any area of contact of said flanges with said rails to a minimum.

15. The transportation system set forth in claim 13 wherein said acute angle is approximately 5°.

16. The transportation system set forth in claim 13 wherein an inner portion of the surfaces of said flanges engage the lower portion of said rails only if the vehicle raises off the rails.

* * * * *